United States Patent [19]

Claasen et al.

[11] Patent Number: 4,660,216

[45] Date of Patent: Apr. 21, 1987

[54] TRANSMISSION SYSTEM FOR THE TRANSMISSION OF DATA SIGNALS IN A MODULATION BAND

[75] Inventors: Theodoor A. C. M. Claasen; Gerardus F. M. Beenker; Petrus J. van Gerwen; Johannes M. Meijer; Martinus L. N. Didden, all of Eindhoven, Netherlands

[73] Assignee: U.S. Philips Corporation, New York, N.Y.

[21] Appl. No.: 707,701

[22] Filed: Mar. 4, 1985

[30] Foreign Application Priority Data

Mar. 2, 1984 [NL] Netherlands ............... 8400677

[51] Int. Cl.⁴ .................................................. H04L 25/34
[52] U.S. Cl. ..................................... 375/58; 375/18; 375/39; 375/60; 375/103; 333/20; 364/724
[58] Field of Search ............. 333/18, 20, 28 R; 364/724; 375/12, 14, 18, 58, 60, 103, 39

[56] References Cited

U.S. PATENT DOCUMENTS

| | | | |
|---|---|---|---|
| 3,032,725 | 5/1962 | Knox-Seith | 333/20 |
| 3,252,093 | 5/1966 | Lerner | 333/20 |
| 4,285,045 | 8/1981 | Tamori et al. | 364/724 |
| 4,524,424 | 6/1985 | White | 364/724 |

*Primary Examiner*—Benedict V. Safourek
*Attorney, Agent, or Firm*—Jack E. Haken; Anne E. Barschall

[57] ABSTRACT

A transmission system for transmitting data signals in a modulation band comprising a transversal smearing filter at the transmitter end and a transversal desmearing filter at the receiver end. In order to obtain an optimum smearing efficiency, the sequence of real individual coefficients of the multiplying factors of the transversal desmearing filter satisfy the requirement that for a given upper limit for the intersymbol interference produced by the cascade arrangement formed by the smearing filter, and the desmearing filter a substantially maximum value is derived for a merit factor indicating by what factor the maximum value of a disturbance is decreased by including a smearing filter and a desmearing filter in the transmission system.

5 Claims, 31 Drawing Figures

TRANSMISSION SYSTEM FOR THE TRANSMISSION OF DATA SIGNALS IN A MODULATION BAND

BACKGROUND OF THE INVENTION

1. Field of the Invention

The invention relates to a transmission system for transmitting data signals in a modulation band. A transmitter and a receiver are coupled thereto by a transmission path. The transmitter comprises a modulator and a transversal smearing filter coupled thereto and the receiver comprises a transversal desmearing filter and a demodulator coupled thereto. The transversal filters each comprises a plurality of series-arranged delay elements, the time delay $\tau$ of the element being equal to the sampling period of an input signal. A signal processing arrangement is coupled to taps provided between every two consecutive elements, and also to an input of the first element and to an output of the last element for multiplying in at least each symbol interval T the signals present on the taps by a real individual coefficient determined for each tap and for summing the product signals thus obtained.

2. Description of the Prior Art

Such a transmission system is disclosed in U.S. Pat. No. 3,032,725.

For data transmission use is often made of the public telephone network. Such a network introduces a number of imperfections such as amplitude and phase distortion, frequency offset, phase jitter and Gausian as well as impulsive noise.

The effects of most of these imperfections are reduced or eliminated with the aid of rather sophisticated digital modems. However until now little attention has been paid in the design of these modems to reducing errors caused by impulsive noise. The effects of impulsive noise on the transmission become very pronounced on switched connections and become the more noticeable as the transmission rates increase.

A solution to combat the effects of impulsive noise is obtained by using a smearing filter at the transmitter and a desmearing filter at the receiver of the transmission system. Generally, these filters have a flat amplitude characteristic with a group delay time which increases or decreases linearly with frequency, the sum of the group delay times of both filters being to the greatest possible extent constant. The group delay time of one filter is complementary to the group delay time of the other filter. When ideal filters are used a data signal passing through both filters is only delayed. However a noise pulse only passes through the desmearing filter, so that the energy of such a noise pulse is smeared in time so that its effect on the data signal is considerably reduced at any instant.

An analogue implementation of such filters is described in the article "On the potential advantage of a smearing-desmearing filter technique in overcoming impulse-noise problems in data systems", by R. A. Wainright, published in IRE Transaction on Communication Systems, December 1961. In view of the stringent requirement that the two filters must be perfectly complementary to each other, such an implementation is not so suitable, more specifically because the filter characteristics degrade. For that reason it is already known from U.S. Pat. No. 4,285,045 to use as an alternative digital implementation of these filters, more specifically of the transversal form, for baseband signals.

The smearing efficiency of the prior art filters is however not optimal.

SUMMARY OF THE INVENTION

The invention has for its object to provide a transmission system for data signals in a modulation band with a substantially optimum smearing of the noise pulses introduced in the transmission path of the transmission system.

According to the invention, the transmission system of the type that for a given upper limit of the intersymbol interference caused by the cascade arrangement of the smearing filter and the desmearing filter the sequence of real coefficients $c_d(n)$, $n=0, 1, \ldots N-1$ of a desmearing filter having $N-1$ delay elements is chosen such that it is not only formed by numbers from the set $\{+1, 0, -1\}$ and for a given output power and a given overall gain of the transmission system a substantially maximum value of a first merit factor $F_1$ is obtained. This is defined by $$F_1 = \frac{\max_n |(\tilde{p} * g)(n)|}{\max_n |(\tilde{p} * \tilde{c}_d * g)(n)|} \quad n = 0, 1, \ldots N-1$$

where $\bar{p}(n) = p(n)e^{-jn\theta_c}$, $\tilde{c}_d(n) = c_d(n)e^{-jn\theta_c}$, where $\theta_c$ is a given modulation angular frequency, $p(n)$ the sampling values of any given noise pulse introduced in the transmission path, and $g(n)$ the impulse response of the filter action, reconverted to the zero frequency, of the receiver without desmearing filter.

This has the advantage that for the same smearing efficiency and a given upper limit of the intersymbol interference a shorter filter is sufficient.

A further embodiment according to the invention provides for the sequence of real coefficients $c_s(n)$, $n=0, 1, \ldots N-1$ of the desmearing filter having $N-1$ delay elements it holds that $c_s(n) = c_d(N_o - n)$, $N_o$ being chosen at random and for all values of n.

This has the advantage that for a given form of the desmearing filter the smearing efficiency is at its maximum when the above-mentioned desmearing filter coefficients are chosen.

BRIEF DESCRIPTION OF THE DRAWINGS

The invention and its advantages will now be described in greater detail with reference to the embodiments shown in the Figures, and:

DESCRIPTION OF THE FIGURES

Figure 1:
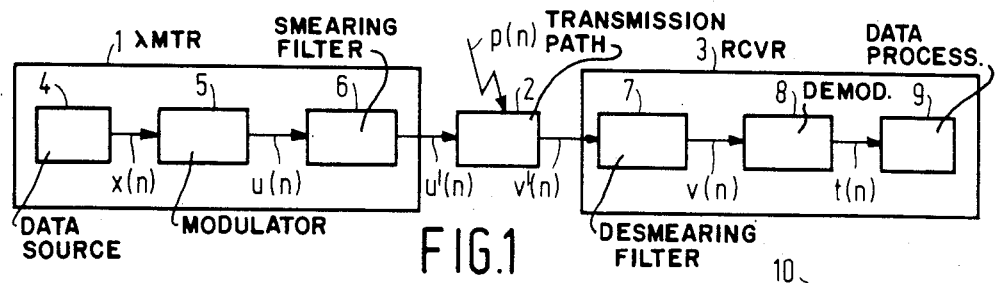
Figure 2:
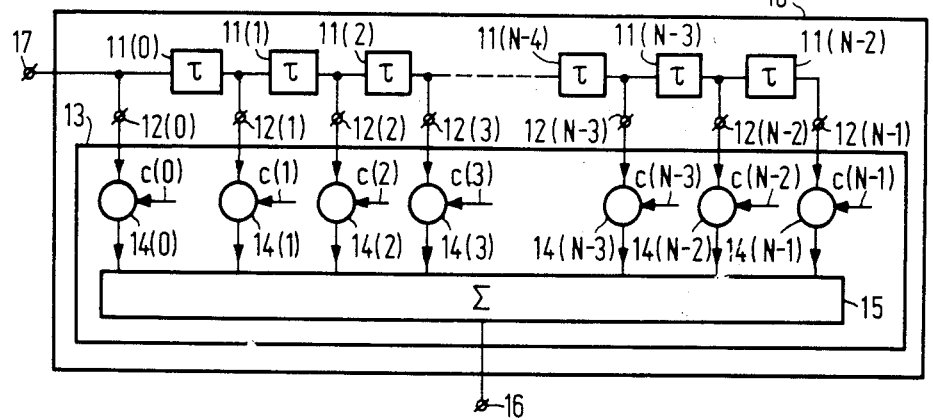
Figure 3A:
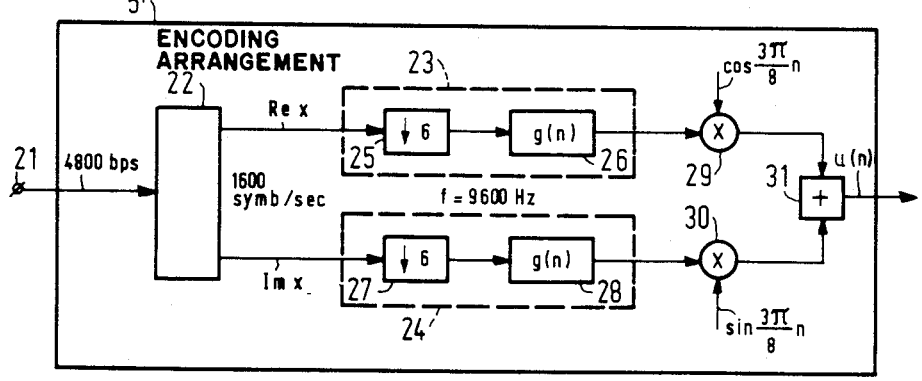
Figure 3B:
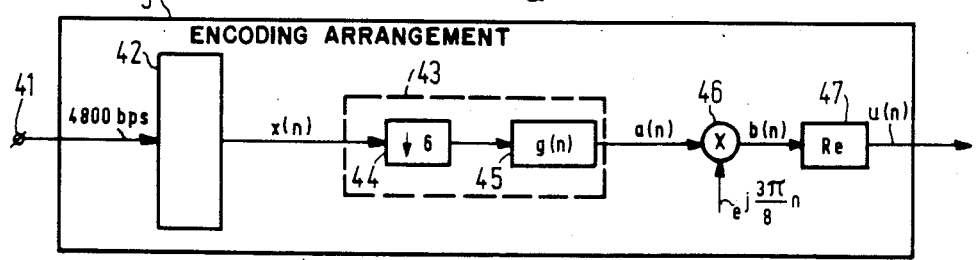
Figure 4:
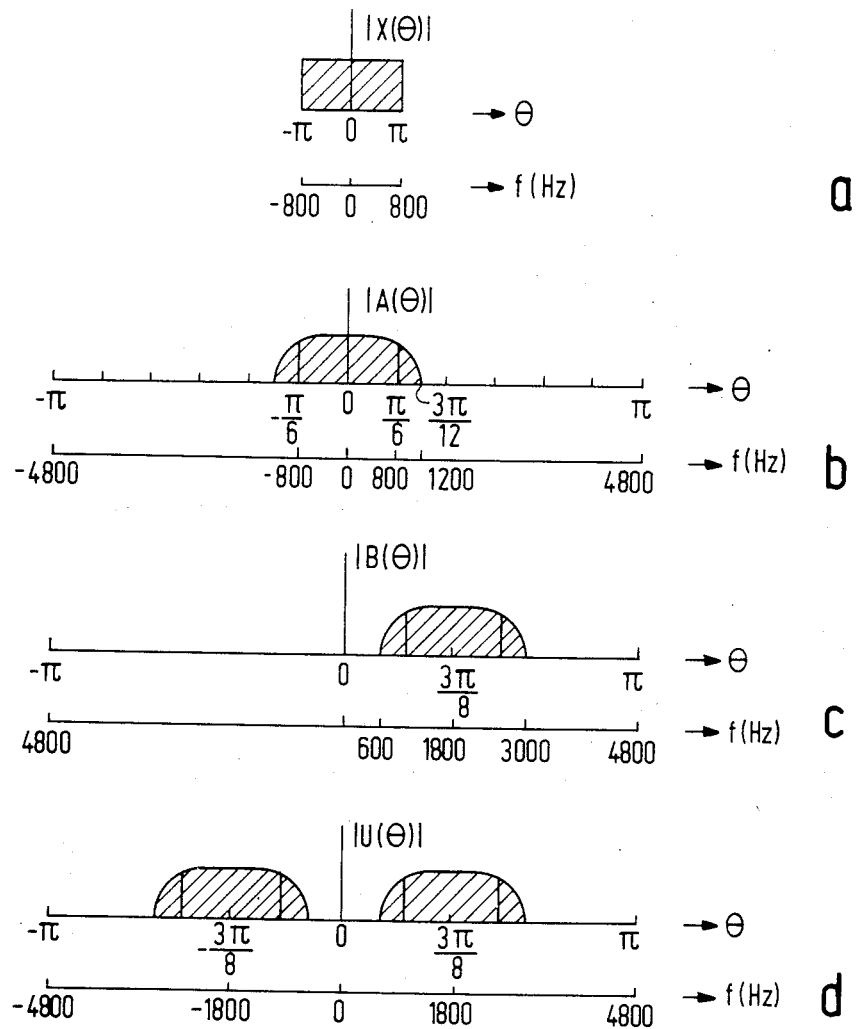
Figure 5:
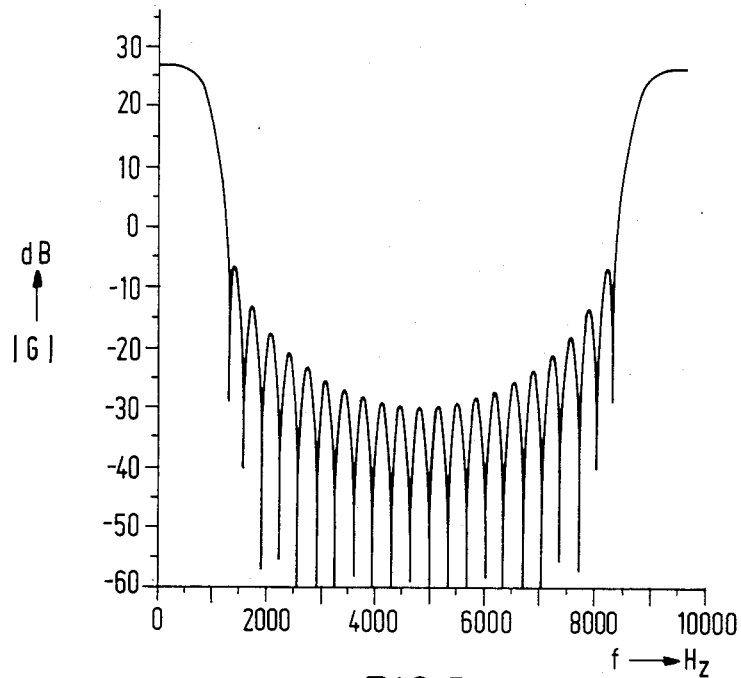
Figure 6A:
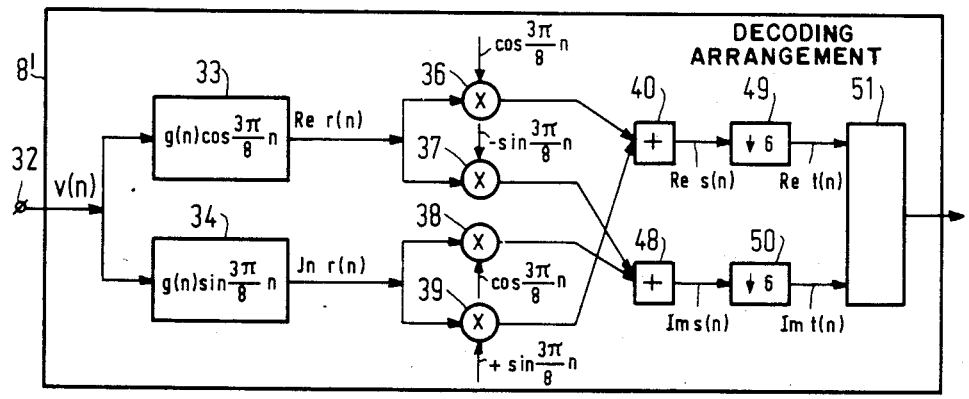
Figure 6B:
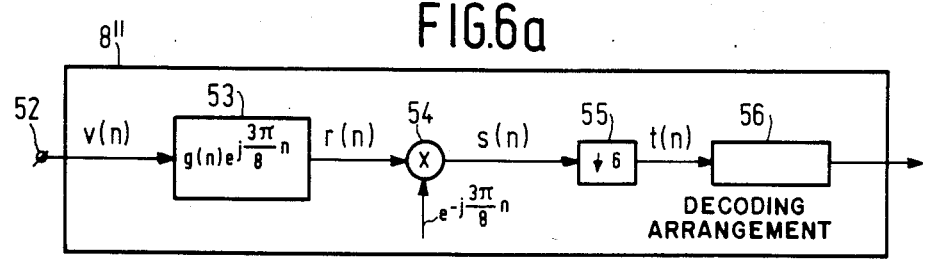
Figure 7:
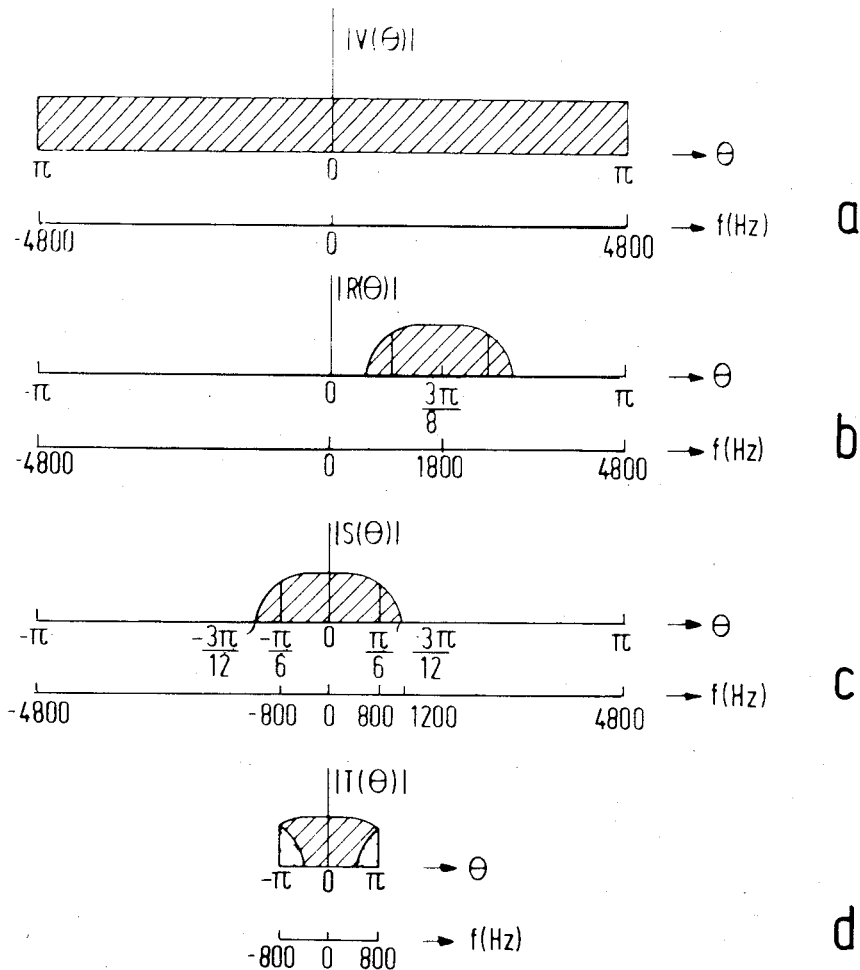
Figure 8:
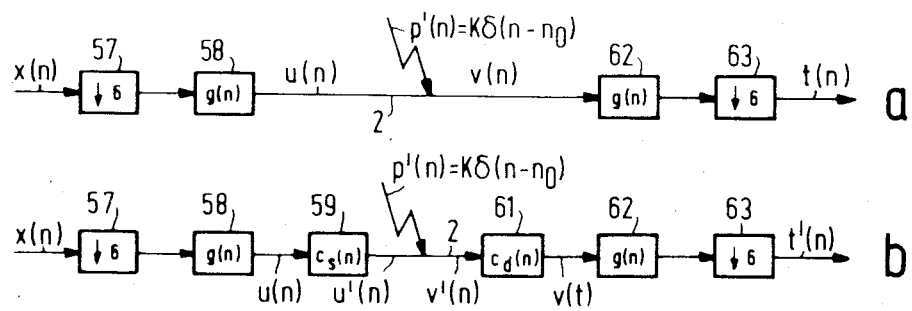
Figure 9A:
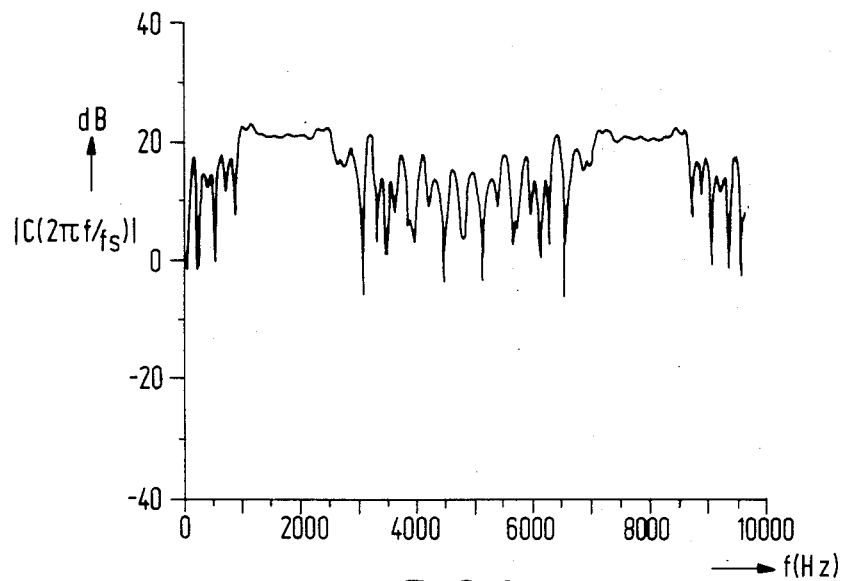
Figure 9B:
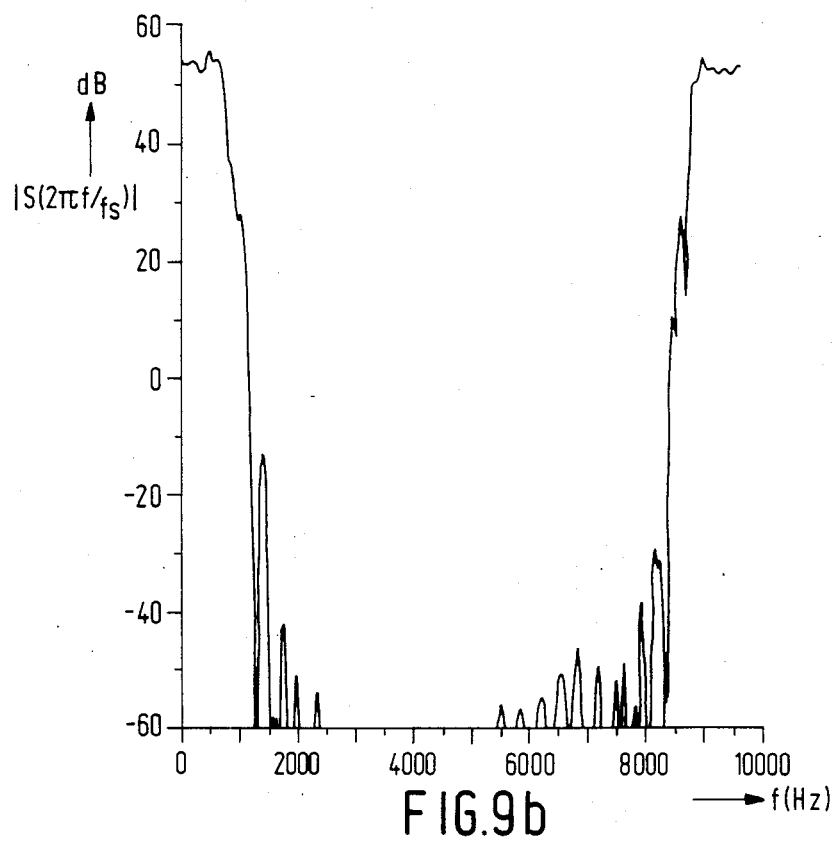
Figure 9C:
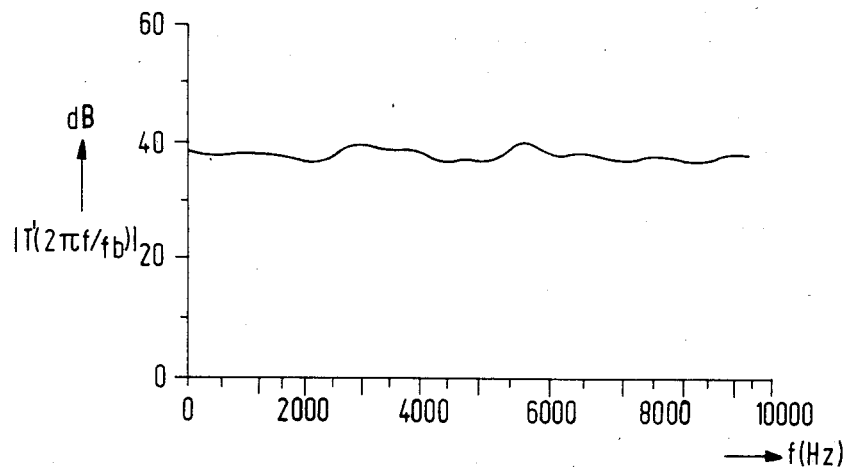
Figure 9D:
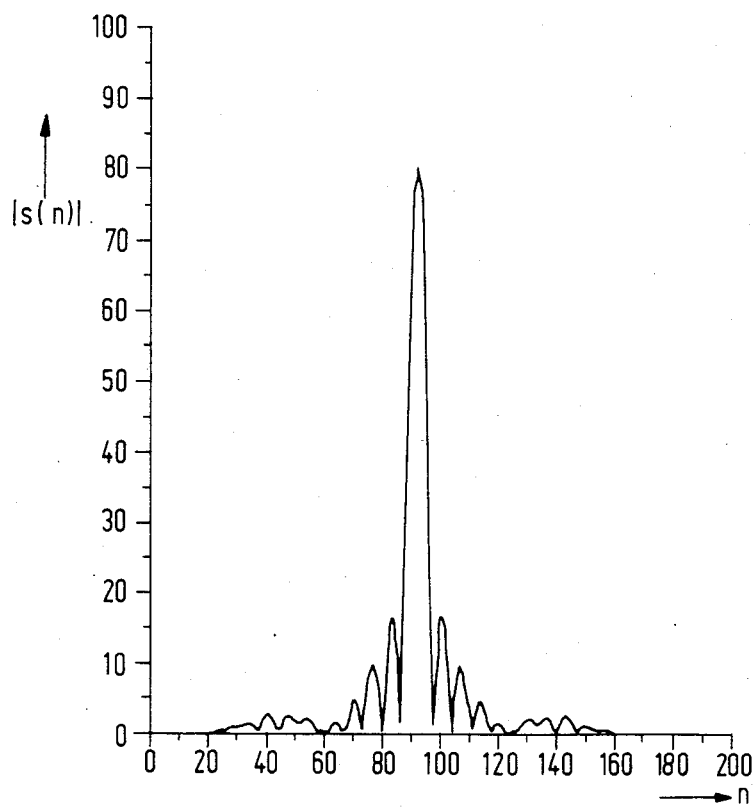
Figure 9E:
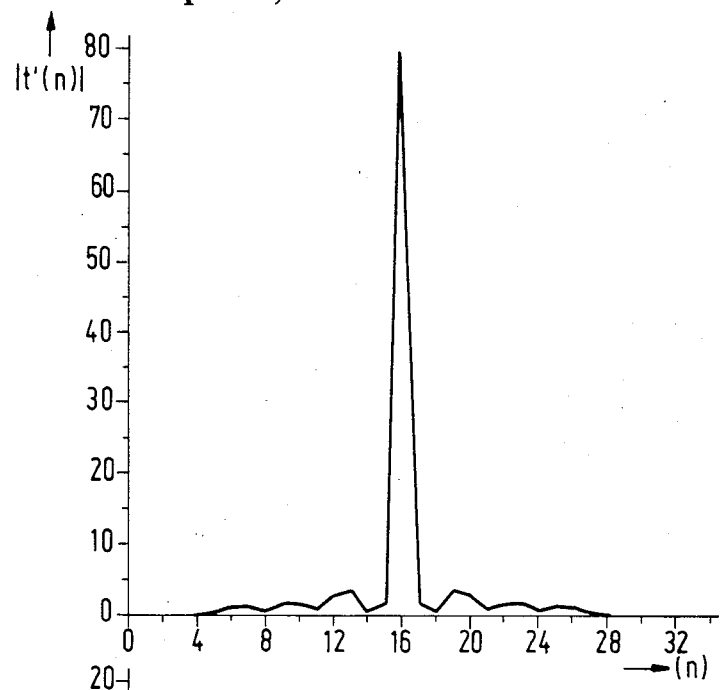
Figure 9F:
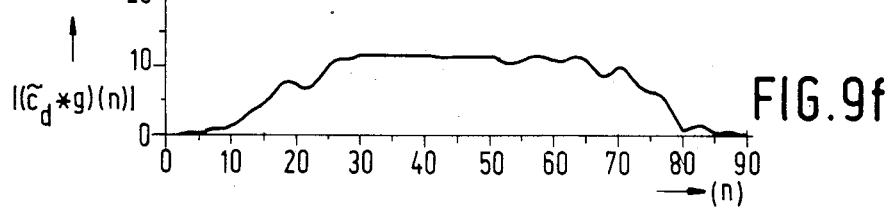
Figure 9G:
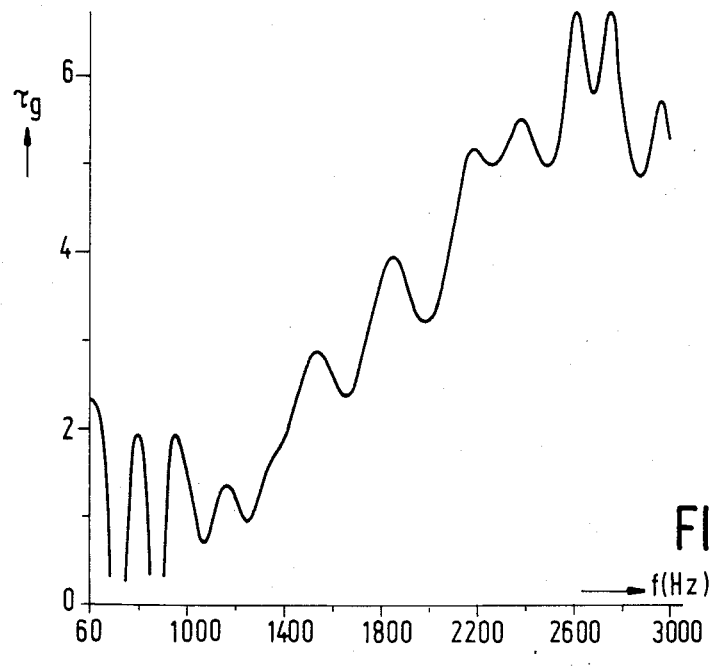
Figure 10A:
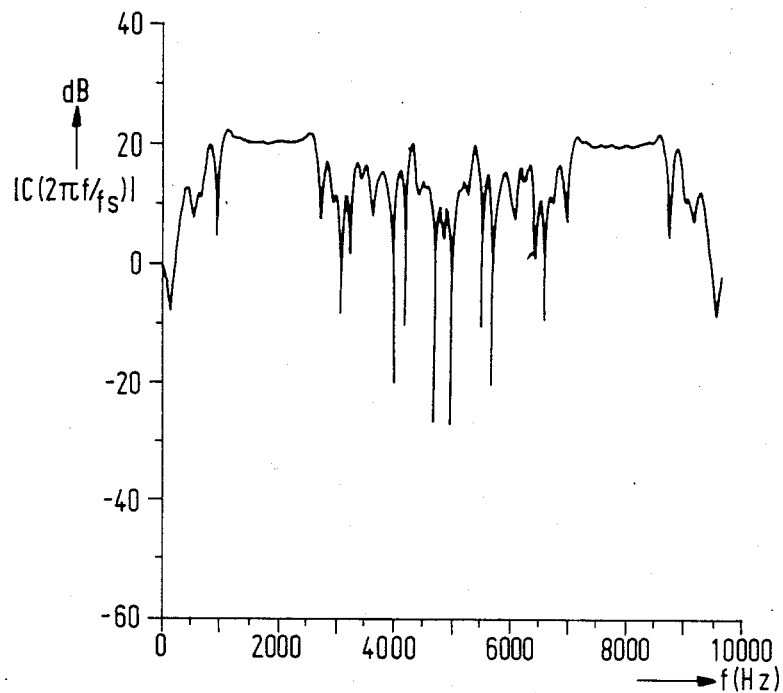
Figure 10B:
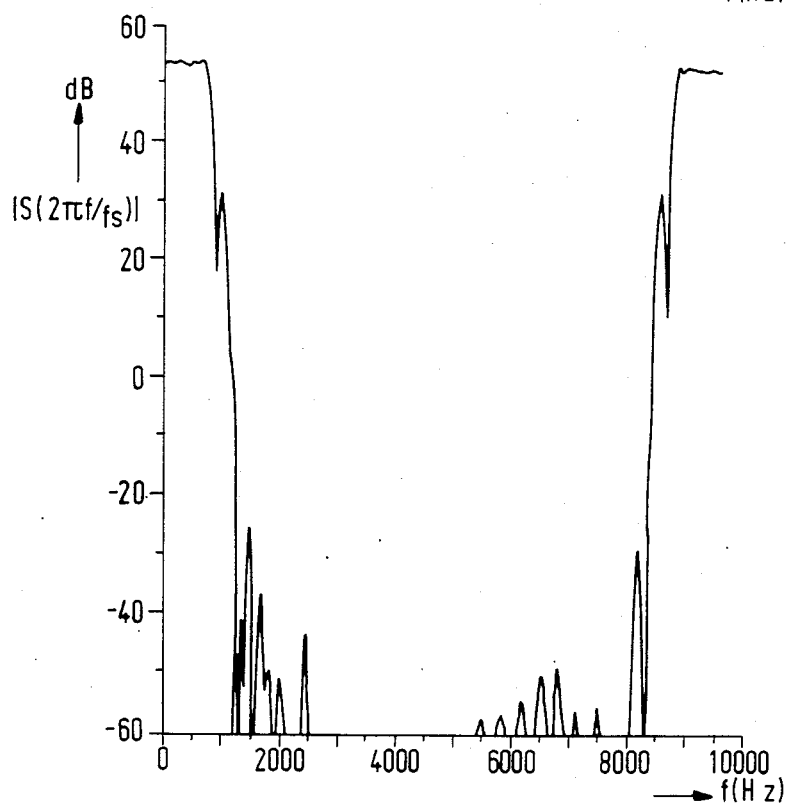
Figure 10C:
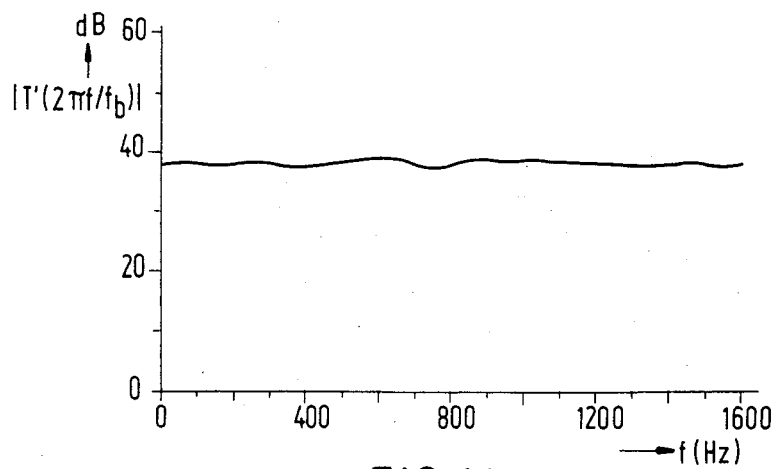
Figure 10D:
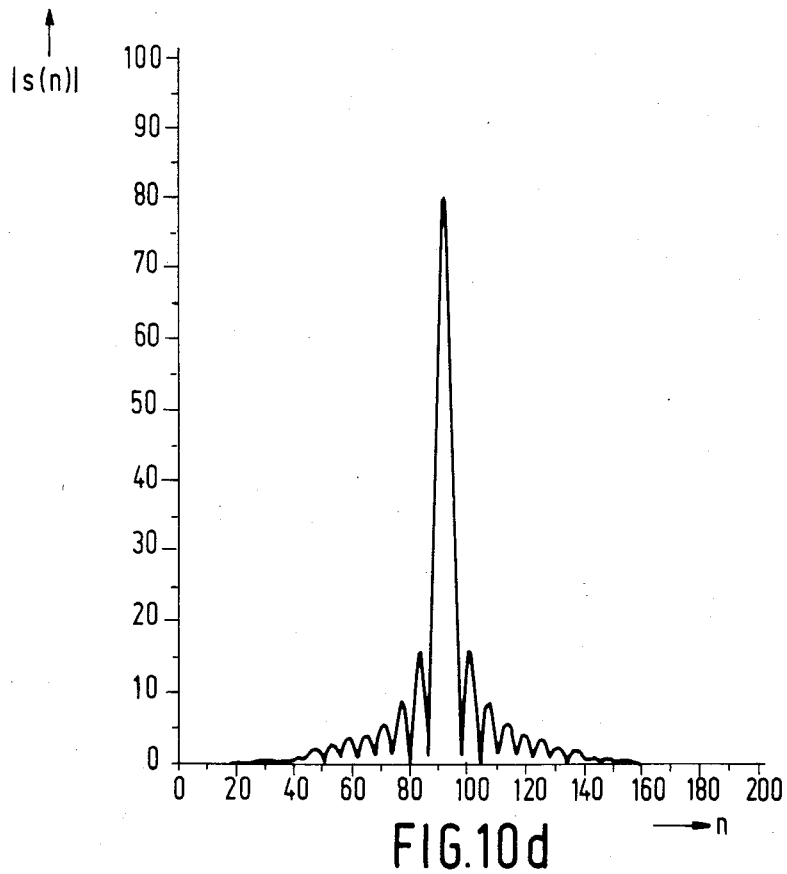
Figure 10E:
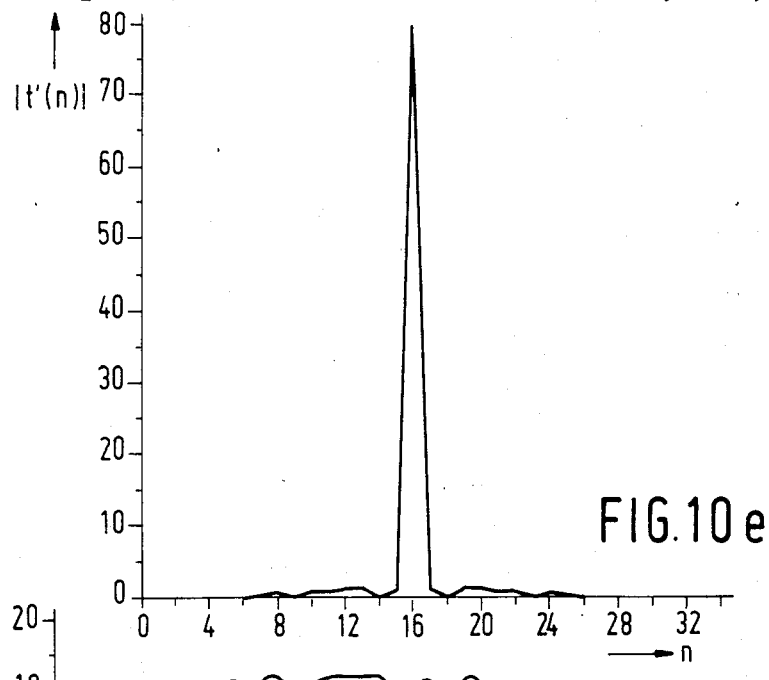
Figure 10F:
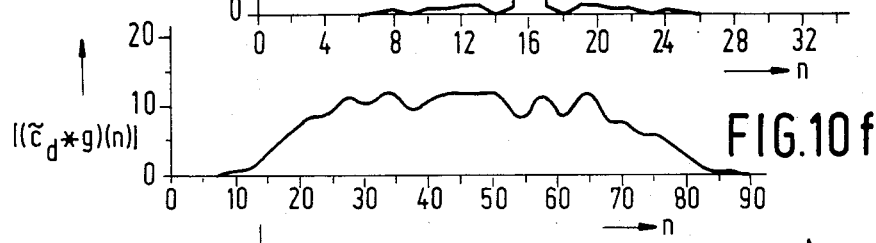
Figure 10G:
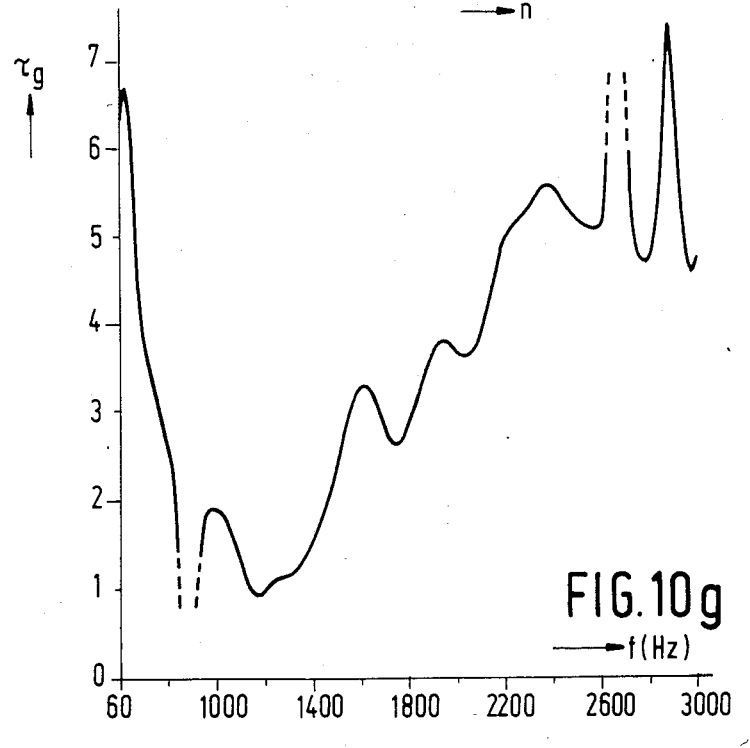

FIG. 1 shows a block circuit diagram of a transmission system for the transmission of data signals in a modulation band, FIG. 2 shows a block circuit diagram of a transversal filter for use in the system of FIG. 1, FIGS. 3a and 3b show a block circuit diagram of a modulator with real and complex signal representation, respectively for use in the system of FIG. 1, FIGS. 4a to d show amplitude spectra of signals occurring in the modulator of FIG. 3, FIG. 5 shows the absolute value of the transmission function of a transmit filter for use in the system shown in FIG. 1, FIGS. 6a and 6b show a block circuit diagram of a demodulator with real and complex signal representation, respectively for use in the system shown in FIG. 1, FIGS. 7a to d show amplitude spectra of the signals occurring in the demodulator shown in FIG. 6, FIGS. 8a and b show an equivalent circuit diagram of the system, shown in FIG. 1, without and with a smearing filter and a desmearing filter, respectively, FIGS. 9a and 10a show amplitude spectra of embodiments of the smearing or desmearing filter of the system illustrated in FIG. 1, FIGS. 9b and 10b show amplitude spectra of the overall impulse responses of the system illustrated in FIG. 8b without interpolation and decimation, comprising filters having amplitude spectra as shown in FIGS. 9a and 10a, respectively, FIGS. 9c and 10c show amplitude spectra of the equivalent overall impulse responses of the system illustrated in FIG. 8b, comprising filters having the amplitude spectra shown in the FIGS. 9a and 10a, FIGS. 9d and 10d show the amplitude of the overall impulse response associated with the filters having the spectra shown in FIGS. 9b and 10b, FIGS. 9e and 10e show the amplitude of the equivalent overall impulse responses of the system comprising filters having spectra as shown in FIGS. 9c and 10c, FIGS. 9f and 10f show the amplitude of the smeared impulse response of noise pulses received by the receiver shown in FIG. 1 which comprise filters having amplitude spectra as shown in FIGS. 9a and 10a, respectively and FIGS. 9g and 10g show the group delay time of the smearing or desmearing filter having amplitude spectra as shown in the respective FIGS. 9a and 10a.

DESCRIPTION OF THE PREFERRED EMBODIMENTS

The transmission system, shown in FIG. 1, for the transmission of data signals in a modulation band comprises a transmitter 1 and a receiver 3 coupled to the transmitter through a transmission path 2. The transmitter 1 comprises a data source 4 to which a modulator 5 is connected for modulating a signal x(n) produced by the data source on a carrier. The modulation signal u(n) thus obtained is smeared by means of transversal smearing filter 6 and applied as a signal u'(n) to the transmission channel 2. In the channel impulse noise p(n) is added to the signal. A signal v'(n) applied to the receiver 3 by the transmission channel 2 is smeared by a transversal desmearing filter 7 and applied as a signal v(n) to a demodulator 8. The demodulated signal t'(n) is further processed in a data processing arrangement 9.

FIG. 2 shows an embodiment of a transversal filter 10. Such a filter comprises a cascade arrangement of $N-1$ delay elements 11(0) to 11(N−2), each having a time delay $\tau$ equal to the sampling frequency of the signals x(n$\tau$) applied to the input terminal 17. In this case the sampling period $\tau$ is less than the symbol period T, as will be explained in greater detail in an embodiment of a speech band signal. The cascade arrangement 11(0) to 11(N−2) can be realized in a simple way as a digital embodiment using a shift register or as an analogue embodiment using what is commonly denoted as a bucket memory. A tap 12(0) is connected to the input of the first delay element 11(0), the taps 12(1); 12(2) ... ; 12 (N−3); 12(N−2) are connected to the junction between two consecutive elements 11(0)-11(1); 11(1)-11(2); ... ; 11(N−3)-11(N−2), respectively and the tap 12(N−1) is connected to the output of the last element 11(N−2). The taps are connected to a signal processing arrangement 13 for multiplying by means of multiplier arrangements 14(0) to 14(N−1) the signals x(n$\tau$)' present on the taps 12(0) to 12(N−1) by the coefficients c(0) to c(N−1) applied individually thereto. These multipliers may be of an analogue construction, for example potentiometers, whose taps represent the values of the coefficients c(n). Alternatively when these multipliers are of a digital construction the values c(n), $n=0, 1, \ldots N-1$ are stored in a memory, not shown. The product signals thus obtained are summed at least every symbol interval in a summing arrangement 15 and applied as an output signal $\Sigma_n c(n) \times x(n\tau)$ to output 16.

A transmission system in accordance with the invention for the transmission of data signals in a modulation band with a substantially optimum smearing efficiency of noise pulses will be described in greater detail with reference to a transmission system operating in the speech band from 600 to 3000 Hz. Let it be assumed that the data source 4 supplies a 4800 bits/sec data signal and the modulator 5 modulates in 8-stages a carrier signal having a frequency $f_c$ of 1800 Hz.

FIG. 3a shows a block circuit diagram of an embodiment 5' of the modulator 5, based on signals having real values and FIG. 3b shows a block circuit diagram of an equivalent representation of this embodiment 5" for signals having complex values.

A data signal applied to the modulator 5' of FIG. 3a or 5" of FIG. 3b, respectively with a bit frequency of 4800 bits/sec is converted in a first encoding arrangement 22 and an identical encoding arrangement 42, respectively in known manner in blocks of three consecutive bits into a complex number x(n) which at any moment assumes one out of eight possible values from the below-defined set.

$$x(n) \epsilon \{e^{jK\pi/4} | K=0, 1, \ldots 7\} \quad (1)$$

where $n=0, \pm 1, \ldots$.

Now the symbol rate for x(n) has become equal to $4800/3 = 1600$ symbols/sec.

The frequency spectrum $|X(\theta)|$ of the sequence x(n) produced by the encoding arrangement 42 is shown in FIG. 4a as a function of the frequency $\theta$, $\theta$ representing the angular frequency $\omega$ standardized to the symbol frequency $f_b$; $\theta = \omega/f_b$.

The encoding arrangement 22 shown in FIG. 3a applies the real portion Re(x) of the complex numbers x(n) to a first interpolating filter 23 and the imaginary portion Im(x) of x(n) to a second interpolating filter 24, which filter 24 is identical to the first filter 23.

These interpolating filters each comprise an interpolator 25, 27 and transmit filters 26 and 28 connected thereto, both having a impulse response g(n). In the interpolators 25, 27 five samples having zero values are inserted in known manner between every two consecutive signal samples applied thereto, as a result of which the sampling rate is increased by a factor of 6 to 9600 Hz. With the aid of the transmit filters 26 and 28 the baseband signal is filtered from the sequence supplied by the interpolators 25 and 27.

In an equivalent description with complex signals, the sequence x(n) produced by the encoding arrangement 42 is applied to a complex interpolating filter 43 in which the sampling frequency is similarly increased by a factor of 6 to 9600 Hz is an interpolator 44 and thereafter filtered in the transmit filter 45 having an impulse response g(n). The values of the impulse response g(n) are obtained by clipping the sequences obtained by an inverse Fourier transform of an ideal transmission function G(θ) given by $$G(\theta) = \begin{cases} 1 & \text{for } |\theta| < \frac{\pi}{12} \\ \cos\left(\theta - \frac{\pi}{12}\right) & \text{for } \frac{\pi}{12} \leq \theta \leq \frac{\pi}{4} \\ 0 & \text{for } |\theta| > \frac{\pi}{4} \end{cases} \quad (2)$$

This transmission function is also used in a corresponding filter in the receiver, but the filter then is a band-pass filter centred around the 1800 Hz carrier frequency. The transmission function is such that the cascade arrangement of the transmit filter and the receive filter is defined by the first Nyquist criterion, which requires that $$\sum_{k=0}^{5} G^2\left(\frac{\theta - 2k\pi}{6}\right) = 1 \quad 0 \leq \theta \leq 2\pi \quad (3)$$

The amplitude of the transmission function G in accordance with an embodiment of a FIR filter having 29 taps is shown in FIG. 5. Let it be assumed hereinafter that these filters are zero-phase filters, the linear phase component required to make these filter casual filters being disregarded.

This implies that g(n) has a maximum at n=0 and is symmetrical on both sides, so that $$g(n) = g(-n) \quad (4)$$

The amplitude spectrum $|A(\theta)|$ of the signal a(n) supplied by the interpolating filter 43 is shown in FIG. 4b.

The signals supplied by the first and second interpolation filters 23 and 24 are thereafter modulated in known manner on a carrier having a frequency $f_c$ of 1800 Hz, with the aid of first and second multiplier arrangements 29 and 30 to which also the signals cos ((3π/8)n) and sind ((3π/8)n) are applied wherein $2\pi f_c/f_s = 2\pi 1800/9600 = (3\pi/8)$. The signals thus obtained are added together in an adder arrangement 31 and applied to the smearing filter 6 of FIG. 1. In an equivalent description with complex signals the signal a(n) of FIG. 3b is multiplied in a multiplying device 46 by the standardized carrier signal $e^{j(3\pi/8)n}$. The amplitude spectrum $|B(\theta)|$ of the signal b(n) produced by the multiplying arrangement 46 is shown in FIG. 4c. Thereafter, with the aid of arrangement 47, a real signal u(n) whose amplitude spectrum $|U(\theta)|$ is shown in FIG. 4d, is derived from the complex signal b(n).

From this Figure it follows that the speech band signal thus obtained only has a contribution in the interval $$\pi/8 \leq \theta \leq (5\pi/8)$$

corresponding to a frequency band from 600 Hz to 3000 Hz, designated speech band hereinafter. Utilizing the fact that the spectrum X(θ) of the input signal is periodic, with a period of 2π, the spectrum of the output signal u(n) can be written as follows.

$$U(\theta) = \frac{1}{2} G(\theta - \theta_c) \times \{6(\theta - \theta_c)\} + \frac{1}{2} G^*\{-(\theta + \theta_c)\} \times \\ *\{-6(\theta + \theta_c)\} \quad (5)$$

where $\theta_c = 2\pi f_c/f_s$ and denotes the complex conjugate value.

After having passed through the smearing filter 6, the spectrum of the output signal u'(n) of the transmitter 1 can be written as $$U'(\theta) = U(\theta) C_s(\theta) \quad (6)$$

where $C_s(\theta)$ represents the transmission function of the smearing filter 6. In a D/A converter, now shown, and a filter connected thereto for suppressing high-frequency contributions, this output signal u'(n) is converted into an analogue signal and transmitted to the receiver 3 through the transmission channel 2.

In the receiver the received signal is applied to the desmearing filter 7 through an anti-aliasing filter and A/D converter, not shown. The influence of these elements may be left out of consideration because of the fact that in said frequency range they have a flat transmission function.

FIG. 6a shows an embodiment 8', with digital real signal values for the demodulator 8 of FIG. 2 and in FIG. 6b an equivalent representation is given of the embodiment 8" with complex signal values. These demodulators operate with a sampling frequency $f_s$ of 9600 Hz.

The demodulator 8' comprises a quadrature receiver followed by a decoding arrangement 51.

A digital signal v(n) which is produced by the A/D converter, not shown, and whose amplitude spectrum $|V(\theta)|$ in FIG. 7a is given as a function of θ, θ being equal to $\omega/f_s$ is applied to input terminal 32. A flat input spectrum is assumed.

In FIG. 6a the digital signal v(n) is applied to a first receiving filter 33 having an impulse response g(n) cos ($\theta_c$n) and also to a second receiving filter 34 having an impulse response g(n) sin ($\theta_c$n), where $\theta_c = 2\pi f_c/f_s = 3\pi/8$, which supply the band-limited mutually orthogonal signals Re r(n) and Im r(n). In an equivalent description with complex signals the signal v(n) applied in FIG. 6b to the input terminal 52 is converted in the complex digital filter 53 which is used as a receiving filter and has an impulse response $g(n)e^{j\theta_c n}$ into the complex digital signal r(n) whose amplitude spectrum $|R(\theta)|$ is shown in FIG. 7b.

The impulse response of the receiving filter 53 is chosen such that the transmission function of this filter is a frequency-shifted version of the transmit filter of FIG. 3b so that constraint (3) is satisfied. The same holds for the receiving filters 33 and 34 of FIG. 6a and the transmit filters 26 and 28 shown in FIG. 3a.

The digital signals Re r(n) and Im r(n) (FIG. 6a) are demodulated as follows. On the one hand the signals Re r(n) cos ($\theta_c$n) and Im r(n) sin ($\theta_c$n) are formed, using the multipliers 36 and 39 and added together in a summing arrangement 40 to form the digital signal Re s(n)=Re r(n) cos ($\theta_c$n)+Im r(n) sin ($\theta_c$n) and on the other hand the signals −Re r(n) sin ($\theta_c$n) and Im r(n) cos ($\theta_c$n) are formed by means of the multiplying arrangements 37 and 38 and added together in a summing arrangement 48 to form the digital signal Im s(n)=Im r(n) cos (θHd cn)−Re r(n) sin ($\theta_c$n).

Similarly, in FIG. 6b the complex digital signal r(n) is demodulated with the aid of the multiplier 54 by multiplying it by the complex digital signal $e^{-j\theta_c n}$. FIG. 7c shows the amplitude spectrum of the complex digital signal s(n) thus obtained.

The sampling frequency $f_s$ of the digital signals Re s(n) and Im s(n) are divided in known manner by a factor of six to 1600 Hz with the aid of the arrangements 49 and 50, shown in FIG. 6a, which produces the digital signals Re t(n) and Im t(n). Similarly, in FIG. 6b the sampling frequency of the digital complex signal s(n) is reduced to 1600 Hz by the arrangement 55. The amplitude spectrum $|T(\theta)|$ of the signal t(n) thus obtained is shown in FIG. 7d. This Figure clearly shows folding of the amplitude spectrum $|T(\theta)|$ due to the fact that sampling is effected at too low a frequency compared with the bandwidth of the signal.

As however the spectrum $V(\theta)$ of the signal applied to the demodulator 8″ is the equal to the spectrum $U(\theta)$ of the output signal of modulator 5″ and as the product of the transmit filter (26, 28; 45) and the receiving filter (33, 34; 53) satisfies the first Nyquist criterion, the contribution in $T(\theta)$ of the folded portions is coherently added to the contribution of the remaining portion and for $T(\theta)$ the spectrum $x(\theta)$ the spectrum $x(\theta)$ as shown in FIG. 4a is accurately obtained. Because of clipping and rounding of the filter coefficients some symbol interference is however produced, which for the 29-tap FIR filter used is so small as to be disregarded.

Finally, the signals Re t(n) and Im t(n) are converted in known manner into binary data signals of 4800 bits/sec with the aid of the decoding arrangement 51 of FIG. 6a, the same operation being effected for signal t(n) with the aid of the decoding arrangement 56 of FIG. 6b.

The spectrum of t(n) can be expressed as follows in the spectrum of g(n) of the receiving filter and in the spectrum of the input signal v(n);

$$T(\theta) = \frac{1}{6} \sum_{k=0}^{5} G\left(\frac{\theta + 2k\pi}{6}\right) V\left(\frac{\theta + 2k\pi}{6} + \theta_c\right) \quad (7)$$

Assuming, as in the foregoing, that $V(\theta) = U(\theta)$ and when the smearing filter 6 and the desmearing filter 7 are omitted from the link, (7) can be written as follows with the aid of (5):

$$T(\theta) = \frac{1}{12} \sum_{k=0}^{5} G^2\left(\frac{\theta + 2k\pi}{6}\right) X(\theta) + \quad (8)$$

$$\frac{1}{12} \sum_{k=0}^{5} G\left(\frac{\theta + 2k\pi}{6}\right) G \mathcal{H}\left(-\frac{\theta + 2k\pi}{6} - 2\theta_c\right) X(\theta + 12\theta_c)$$

As the attenuation of the stopband of the transmit and receiving filter has a sufficiently high value, the last term of (8) may be disregarded and it holds that:

$$T(\theta) = H(\theta) \times (\theta) \quad (9)$$

$$\text{where } H(\theta) = \frac{1}{12} \sum_{k=0}^{5} G^2\left(\frac{\theta + 2k\pi}{6}\right) \quad (10)$$

If the smearing filter 6 and the desmearing filter 7 have the impulse responses $c_s(n)$ and $c_d(n)$ with the transmission functions $C_s(\theta)$ and $C_d(\theta)$, the frequency spectrum $T'(\theta)$ of the complex digital signal t'(n) can be written, when the transmit filter 45 and the receiving filter 53 have a large attenuation in the stopband, as $$T'(\theta) = H'(\theta) Z(\theta) \quad (11)$$

where $$H'(\theta) = \frac{1}{12} \sum_{k=0}^{5} G^2\left(\frac{\theta + 2k\pi}{6}\right) C_s\left(\frac{\theta + 2k\pi}{6} + \theta_c\right) C_d\left(\frac{\theta + 2k\pi}{6} + \theta_c\right) \quad (12)$$

Equivalent circuit diagrams of the transmission systems represented by the expressions (9) and (11) without and with smearing and desmearing filters are shown in FIGS. 8a and 8b.

These systems both comprise, in succession, an arrangement 57 for increasing the sampling frequency by a factor of 6, a transmit filter 58 and a receiving filter 62 and an arrangement 63 for reducing the sampling frequency by a factor of 6, the system shown in FIG. 8b also comprising a smearing filter 59 and a desmearing filter 61.

The influence of the smearing filter 59 and the desmearing filter 61 is then represented by the complex impulse responses $$\tilde{c}_s(n) = c_s(n) e^{-jn\theta_c} \quad (13)$$

and $$\tilde{c}_d(n) = c_d(n) e^{-jn\theta_c}, \text{ respectively} \quad (14)$$

the modulation on being accounted for by the notation $\sim$. First, according to the invention, merit factors $F_1$ and $F_2$ are derived which are a measure of the smearing efficiency of the impulsive noise and a measure of the ratio of the signal to the symbol interference generated by the combination of the smearing and desmearing filter itself, respectively.

For deriving these merit factors, the signal amplitudes of the signals in the system must be normalized to prevent the smearing filter 6 from having too high a gain factor, which implies an increase of the power on the transmission path 2, for example a telephone line.

For that purpose let it be assumed that (1) the power on the transmission path 2 including a smearing filter 59 and a desmearing filter 61, as shown in FIG. 8b and without smearing filter 59 and desmearing filter 61 as shown in FIG. 8a, are the same so that it holds that $$E(u^2(n)) = E(u'^2(n)) \quad (15)$$

and that (2) the desired signal components in the output signals t(n) and t'(n) have in both cases the same amplitudes. By introducing adequate phase corrections in the transmission functions of the smearing filter 59 and the desmearing filter 61, the desired component may be defined as h(0) and h'(0), where h(n) and h'(n) are the inverse Fourier transforms of the transfer functions $H(\theta)$ and $H'(\theta)$ defined in the expression (10) and (12).

Starting from uncorrelated input data so that $$E[x(n)x^*(n+k)] = j(k) \tag{16}$$

the normalization constraints can be represented as follows (1) equal power on the line if $$\frac{1}{12} \int_{-\pi}^{+\pi} |G^2(\theta)| d\theta = \frac{1}{2\pi} \int_{-\pi}^{+\pi} |G(\theta)|^2 |C_s(\theta + \theta_c)|^2 d\theta \tag{17}$$

and (2) equal desired output signal if $$h(0) = h'(0) \tag{18}$$

The smearing efficiency is defined on the basis of one single noise pulse of a shorter duration than the sampling period with amplitude K, which occurs at any instant $n_o$, so that it holds that $$p'(n) = K\delta(n - n_o) \tag{19}$$

for the impulsive noise $p(n)$ shown in FIG. 1. Let it be assumed that the interval between the noise pulses exceeds the duration of the impulse response of the filters. The accent notation further indicates impulsive noise of a shorter duration than the sampling period $\tau$.

For the equivalent circuit diagram, shown in FIG. 8a, of the transmission system without smearing and desmearing filters the input signal $v(n)$ of the filter 62 is equal to $$v(n) = u(n) + p(n)$$

which gives an output signal $t(n)$ having a frequency spectrum equal to $$T(\theta) = H(\theta) X(\theta) + \tag{20}$$

$$1/6 \sum_{k=0}^{5} G\left(\frac{\theta + 2k\pi}{6}\right) P\left(\frac{\theta + 2k\pi}{6} + \theta_c\right)$$

From this it follows that for the impulsive noise $p(n)$ defined by (19) the corresponding response is equal to $$t(n) = x^*h)(n) + Ke^{-jn_o\theta_c}g(6n - n_o) \tag{21}$$

where $$(x \quad h)(n) = \sum_k x(k) h(n - k) \tag{22}$$

is the convolution of the input signal $x(n)$ with the effective overall impulse response $h(n)$ of the system.

Correspondingly, it holds for the equivalent circuit diagram, shown in FIG. 8b, of the transmission system comprising smearing and desmearing filters that the output signal $t'(n)$ of the demodulation filter 21 is equal to $$t'(n) = x^*h')(n) + Ke^{-jn_o\theta_c}(g^*c_d)(6n - n_o) \tag{23}$$

where $h'(n)$ is the effective overall impulse response of the system corresponding to the transmission function $H'(\theta)$ as defined in (12), and $c_d(n)$ as defined in (14).

Expression (23) can be written as $$t'(n) = (x^*h)(n) + (x^*\mu)(n) + Ke^{-jn_o\theta_c}(g^*\tilde{c}_d)(6n - n_o) \tag{24}$$

where $\mu(n) = h'(n) - h(n)$.

Expression (24) clearly demonstrates that there are two types of interferences in the output signal $t'(n)$, namely: the inter symbol interference caused by the nonideal matching of the smearing and desmearing filters given by the term $(x^*\mu)(n)$ and the smeared noise pulse $p'(n)$ given by the term $$Ke^{-jn_o\theta_c}(g^*\tilde{c}_d)(6n - n_o)$$

Comparing (21) to (24) gives as a first merit factor $F'_1$ for the speech band system, the accent notation indicating that $F_1$ holds for the pulse noise defined by (19), (1) the smearing efficiency $$F_1 = \frac{\max_n |g(n)|}{\max_n |g \ast c_d(n)|} \tag{25}$$

This factor indicates the factor by which the maximum value of a disturbance in the output signal is reduced as a result of the insertion of the smearing filter 59 and the desmearing filter 61 in the transmission system.

Since $n_o$ has been chosen at random $(6n - n_o)$ may have an arbitrary value and in (25) the maximum across all values of n must be determined.

Comparing (21) to (24) gives as a second merit factor $F_2$ (2) the signal relative to the self-generated intersymbol interference $$F_2 = \frac{h(O)}{\left|\sum_n |\mu(n)|\right|^2} \tag{26}$$

where $h(0) = \max_n |h(n)|$

Instead of the shape shown in the expression (19) for the impulsive noise, it is alternatively possible to consider impulsive noise formed by two consecutive pulses of equal amplitudes but of opposite polarity, denoted bipolar pulses in the following, designates by ". It then holds that:

$$p''(n) = K(\delta(n - n_o) - \delta(n - n_o - 1)) \tag{27}$$

For such impulsive noise the output signal is $$t(n) = (x^*h)(n) + Ke^{-jn_o\theta_c}\{g(6n - n_o) - e^{-j\theta_c}g(6n - n_o - 1)\} \tag{28}$$

if no smearing and desmearing filters are used, and is equal to $$t'(n) = (x^*h')(n) + Ke^{-jn_o\theta_c}\{(g^*c_d)(6n - n_o) - e^{-j\theta_c}(g^*c_d)(6n - n_o - 1)\} \tag{29}$$

when such filters are present in the system.

This gives as a first merit factor $F''_1$.

(3) The smearing efficiency for bipolar pulses $$F'_1 = \frac{\max_n |g(n) - e^{-j\theta_c} g(n-1)|}{\max_n |(g \ \tilde{c}_d)(n) - e^{-j\theta_c} (g \ \tilde{c}_d)(n-1)|} \quad (30)$$

So, generally, the first merit factor $F_1$ is defined by $$F_1 = \frac{\max_n |(\tilde{p} \ g)(n)|}{\max_n |(\tilde{p} \ \tilde{c}_d \ g)(n)|} \quad (30b)$$

where $\tilde{p}(n) = p(n)e^{-jn\theta_c}$ and $\tilde{c}_d$ in accordance with (14) for $p(n)$ given by (19) it changes into 25, for $p(n)$ given in (27) it changes into (30).

In the case of two consecutive pulses of equal amplitudes and the same phase, the first merit factor $F_1$ will be denoted in the sequel by $F'''_1$.

It will be obvious that the first merit factor may have many values, each adapted to a special model of the impulsive noise.

It will be demonstrated with reference to the factors $T'_1$ or $F''_1$ or $F'''_1$ and $F_2$ that filter coefficients $c_d(n)$ can be determined which result in an optimum smearing of the impulsive noise.

To determine the coefficients $c_s(n)$ of the smearing filter and $c_d(n)$ of the desmearing filter let the starting point be filters having the same coefficients but in the inverse sequence, namely $$c_d(n) = c_s(N_o - n) \quad (31)$$

for a random value of $N_o$ and for all values of n. This choice has two advantages, (1) only one set of coefficients needs to be stored in the transmitter or the receiver in a duplex transmission system and (2) for any given sequence of coefficients $c_d(n)$ of the desmearing filter the sequence of coefficients of the smearing filter $c_s(n)$ determined thereby results in a maximum smearing efficiency, for example in an absolute maximum of the first merit factor $F'_1$. This can be demonstrated as follows.

Starting point is normalized transmit and receiving filters such that $$\sum_n g^2(n) = 1 \quad (32)$$

The factor $F'_1$ which in accordance with the expression (25) apparently only depends on the coefficients of the desmearing filter, also depends on the smearing filter, more specifically because of the normalizations defined by (17) and (18). To express this more explicitly $c_d(n)$ is split as follows into two terms $$c_d(n) = K_d g_d(n) \quad (33)$$

where $K_d$ is a real positive gain which is chosen such that $$\max_n |(g^* \tilde{q}_d)(n)| = 1 \quad (34)$$

where $\tilde{q}_d = q_d(n)e^{-jn\theta_c}$ and $q_d(n)$ represents the characteristic of the desmearing filter.

Then expression (25) can be written, using expression (33), as $$F'_1 = g(0)/K_d \quad (35)$$

which has an absolute maximum for a minimum value of $K_d$.

For a given desmearing filter, that is to say for given values of $q_d(n)$ this can only be obtained by choosing a smearing filter for which $K_d$ is minimal.

To obtain the corresponding coefficients, the expressions (17) and (18) are written, utilizing the normalization of the transmit and receive filters as defined in (32) and Parseval's relation, as $$h(0) = \frac{1}{2} \int_{-\pi}^{+\pi} G^2(\theta) \, d\theta = 1 \quad (36)$$

$$h'(0) = \frac{1}{2} \int_{-\pi}^{+\pi} G^2(\theta) C_s(\theta + \theta_c) C_d(\theta + \theta_c) \, d\theta = 1 \quad (37)$$

and $$\frac{1}{2} \int_{-\pi}^{+\pi} G^2(\theta) |C_s(\theta + \theta_c)|^2 \, d\theta = 1 \quad (38)$$

In these expressions use is also made of the symmetry of the impulse response $g(n)$ of the transmit and receive filters, as defined in (4), which results in $G(\theta)$ having real values.

Applying the Cauchy-Schwarz inequality to expression (37) gives that $$1 = \left| \frac{1}{2\pi} \int_{-\pi}^{+\pi} G^2(\theta) C_s(\theta + \theta_c) C_d(\theta - \theta_c) \, d\theta \right|^2 \leq \quad (39)$$

$$\frac{1}{2\pi} \int_{-\pi}^{+\pi} G^2(\theta) |C_s(\theta + \theta_c)|^2 \, d\theta$$

$$\frac{1}{2\pi} \int_{-\pi}^{+\pi} G^2(\theta) |C_d(\theta + \theta_c)|^2 \, d\theta$$

where the sign of equality only holds when $$G(\theta)C_s(\theta + \theta_c) = G(\theta)C_d^*(\theta + \theta_c) \quad (40)$$

From (38) and (39) it follows, after the introduction of $$C_d(\theta + \theta_c) = K_d O_d(\theta + \theta_c)$$

that $$K_d^2 \geq \frac{1}{\frac{1}{2\pi} \int_{-\pi}^{+\pi} G^2(\theta) |Q_d(\theta + \theta_c)|^2} \quad (41)$$

For a given form of the desmearing filter the right-hand side of (41) has a given value. So the minimum value of $K_d$ is obtained when the sequence $c_s(n)$ is chosen such that the sign of equality holds, which is compatible with (40). Expression (40) does not fully specify the filter as it only relates $C_s(\theta + \theta_c)$ to $C_d(\theta + \theta_c)$ in areas where $G(\theta) \cdot 0$. In the areas in which $G(\theta)$ is equal to zero, $C_s(\theta + \theta_c)$, and consequently $C_d(\theta + \theta_c)$ can be chosen arbitrarily, since this choice does not affect those signals which are important for the transmission function of the system. The optimum choice is therefore $C_s(\theta+\theta_c)=C_d{}^*(\theta+\theta_c)$, which is to be used for all values of $\theta$, which proves (31).

For that choice the sign of equality in (41) holds, which expression can be written with the aid of Parseval's relation as $$K_d{}^2 = \frac{1}{\sum_n |(g*\tilde{q}_d)(n)|^2} \qquad (42)$$

The constraint defined in (34) being respected, it will be obvious that $K_d$ can be reduced by increasing all those values of $|(g*\tilde{q}_d)(n)|$ which are not yet at their maximum. It consequently holds that the greater the number of values of $(g*\tilde{q}_d)(n)$ having an amplitude near their maximum (which maximum is equal to unity), the better the properties of the filter.

Assuming the filters $q_d(n)$ and $g(n)$ to have lengths equal to N and M, respectively the length of $(g*\tilde{c}_d)(n)$ is equal to $N+M-1$, so that (42) can be written as $$K_d{}^2 \geq \frac{1}{N+M-1} \qquad (43)$$

This gives a maximum value for $F'_1$ defined by $$F'_1 \leq |g(0)| \sqrt{N+M-1} \qquad (44)$$

This value is only obtained if $$(g*\tilde{q}_d)(n)=1 \qquad (45)$$

for all values of n along the length of the filter. If $g(n)$ is a low-pass filter and $g(n)$ is consequently small at the edges (for example for $|n|\approx M/2$) this requires very large changes in $q_d(n)$, which results in a low value for the second merit factor $F_2$.

The value as defined in (34) is therefore not very suitable for use. A better choice is to assume that $|(g*\tilde{q}_d)(n)|$ can be kept approximately constant over the length of the impulse response of the smearing filter, which yields an estimated absolute maximum value of the smearing efficiency of $$F'_1 \leq |g(0)| \sqrt{N} \qquad (46)$$

By way of embodiment, use is made of a method, still to be described hereinafter, for searching for long sequences $c(n)$ which result in high merit factors $F_1$ and $F_2$ for a modulation band system. More specifically, this method will be described for the speech band system and for lengths of the smearing filter and desmearing filters equal to 64, although this method can be used for any length of the filters.

The description is based on binary sequences which are defined by the expression $$b(n)=\text{sign} (\sin (n(n+1)(\pi/2N)+p)+r(n)) \qquad (47)$$

for $0<n\leq N-1$, where sign (x) is equal to 1 when $x>0$ and $-1$ when $x<0$ and where p is any phase in the range from $0\leq p\leq \pi$ and $r(n)$ is an arbitrary white stochastic procedure with uniform amplitude distribution satisfying the requirement that $$P_{r(n)}(r) = \begin{cases} \frac{1}{2} & |r| \leq 1 \\ 0 & |r| > 1 \end{cases} \qquad (48)$$

This sequence, which is defined in (47) applies to a frequency range from zero to a predetermined given frequency. Matching to a modulation band is effected as follows:

The signal $\sin n(n+1)\pi/2N$ is a frequency-modulated signal and has the instantaneous frequency $$\theta(n)=n\pi/N \quad 0\leq n\leq N-1$$

So along the overall length of the impulse response $b(n)$ this frequency is varied over the range $$0\leq \theta(n) \leq \pi \quad 0\leq n\leq N-1 \qquad (49)$$

In a modulation band the instantaneous frequency of the impulse response of the desmearing filter is varied only over the frequency range $$\theta_1 \leq \theta(n) \leq \theta_2 \quad 0\leq n\leq N-1 \qquad (50)$$

where $\theta_1$ and $\theta_2$ are the normalized cut-off frequencies of the band of the system, for example the cut-off frequency of the receive filter having the impulse response $g(n)$.

For a speech band in the form of a modulation band there is a limitation of the frequency range from 1000 Hz to f 2600 Hz, so a choice from $$\theta_1 = \frac{1000}{9600} 2\pi = 5\pi/24 \text{ and } \theta_2 = 13\pi/24.$$

This has the advantage that a high value can be realized for the first merit factor $F_1$. In practice, however, the filter $g(n)$ is not an ideal low-pass filter, and it has contributions over a larger frequency range, so that the above choice for $\theta_1$ and $\theta_2$ does not give an optimum value for the second merit factor $F_2$. Optimum values for the merit factors are obtained by having $\theta_1$ vary and then to obtain $\theta_2$ from $$\theta_c-\theta_1=\theta_2-\theta_c \qquad (51)$$

where $\theta_c$ is the centre frequency of the bandpass filter of the signal, which in the embodiment corresponds to $\theta_c=2/\pi 1800/9600=3\pi/8$. The sequences $b(n)$ thus generated are then defined by the expression $$b(n)=\text{sign} (\sin ((n_1-n)(n_1+n+1)\beta+p)+r(n)) \qquad (52)$$

where $n=0, 1, \ldots N-1$.

$\beta = \pi(f_2-f_1)/(N-1)f_s$, wherein $f_1 = \dfrac{\theta_1 f_s}{2\pi}$, $f_2 = \dfrac{\theta_2 f_s}{2\pi}$ and $f_s = 1/\pi$, $n_1$ is equal to the largest integer less than or equal to $\pi f_1/\beta f_s$, p is any arbitrary phase angle in the range from $0\leq p\leq \pi$ and $r(n)$ is an arbitrary white stochastic procedure defined by (48).

$n_1$ and $\beta$ are consequently chosen such that the instantaneous frequency $\theta(n)=n(n+n_1)\beta$, of the impulse response b(n) is defined by $\theta(0) \approx \theta_1, \theta_1 < \theta(n) < \theta_2$ for $0 < n < N-1$ and
$\theta(N-1) \approx \theta_2$ This implies that the instantaneous frequency $\theta$ satisfies (50). Thereafter the coefficients b(n) are determined such that $b(n) \epsilon \{-1, 0, 1\}$.

This is realized by applying the following change procedure, starting from the sequences defined by expression (52).

Check whether change of b(n) for a given value of n, being a change of the binary values +1 or −1 into the values 0 and −1 or +1, respectively, so +1→0 or −1→0, or +1→−1 or vice versa, results in a higher value for the second merit factor $F_2$ or not. If yes, then b(n) is replaced by that value. This is repeated for all values of n. Thereafter the change procedure is repeated wherein also changes from 0→+1 or 0→−1 are considered until no improvement of the value $F_2$ is obtained anymore.

The sequences c(n) with a substantially optimum smearing efficiency are derived therefrom in the following manner.

A predetermined number much less than 1, for example 0.01 is added to or subtracted from the coefficients b(n) of a good ternary sequence and it is determined whether the sequence produces or does not produce better or poorer merit factors. In case the merit factors are better, then b(n) is changed into the real number c(n). This procedure is repeated for all values of n for $0 \leq n \leq N-1$. Then the procedure is repeated until no further improvements are obtained anymore. As in a transmission system only a certain amount of intersymbol interference is permissible, the starting point was ternary sequences with a second merit factor $F_2 \geq 20$ dB. Whilst maintaining this requirement, a determination is made with the aid of the above-described procedure of a sequence of real numbers for the coefficients c(n) of the smearing filter and the desmearing filter, for which the first merit factor $F_1$ has a substantially maximum value.

One of the sequences found, the numbers being changed in steps of 0.01 for a 64-coefficient filter has the merit factor $F'_1 = 10.22$ dB, $F''_1 = 8.28$ dB, $F'''_1 = 9.13$ dB and $F_2 = 20.00$ dB.

This sequence is shown in Table I. The amplitude spectrum $|C(\theta)|$ realised with the aid of a smearing filter of Table I is shown in Figure 9a. In the frequency range from 1000–2600 Hz the spectrum has a reasonably flat characteristic.

It should be noted that the amplitude characteristic of the desmearing filter is the same as that of the smearing filter.

The amplitude of the spectrum of the overall impulse response s(n), given before decimation (see FIG. 6b) of the transmission system comprising a smearing filter and a desmearing filter in accordance with Table I is shown in FIG. 9b. The amplitude of the spectrum of the decimated overall equivalent impulse response t'(n) is shown in FIG. 9c.

FIG. 9d shows the amplitude of the overall impulse response s(n) of the transmission system versus n and FIG. 9e shows the amplitude of the decimated overall equivalent impulse response t'(n) of the system. The low value of intersymbol interference introduced by the smearing filter and the desmearing filter will be obvious from these Figures.

The amplitude of noise pulse p' as a function of n, which pulse is introduced into the transmission path and smeared in the receiver, is shown in FIG. 9f. The substantially constant value of the smeared noise pulse with time is obtained in accordance with the invention by selecting those sequences c(n) for which $F_1$ is defined in (30b) and in this special case $F'_1$ of (25) has a substantially maximum value. The group delay time $\tau_g$ of the desmearing filter as shown in Table I, is however no longer a linear function of the frequency as is shown in FIG. 9g. This is however not objectionable, as long as the group delay time of the smearing filter is substantially complementary to that of the desmearing filter. The group delay time is not defined for two points as the transmission function of the smearing filter has zero point for those values. These values are however located outside the 1000–2600 Hz frequency band used.

Sequences c(n) of this type which produce for other types of noise pulses introduced on the transmission path substantially maximum values for the first merit factor $F_1$ can be found correspondingly.

Thus, Table II shows a sequence with real values for the coefficients c(n) for a filter having 64 coefficients with a substantially maximum value of the first merit factor $F''_1$ for bipolar noise pulses p''(n) such as they are defined in (30) and (27), respectively for a given value of the second merit factor $F_2$. The merit factors amount to $F'_1 = 9.57$ dB, and $F''_1 = 9.39$ dB, respectively for a value of $F_2$ equal to 20 dB.

Another sequence with real values c(n) for the coefficients of a filter is shown in Table III. Therein a value equal to 26.70 dB is chosen for the second merit factor $F_2$. The associated value of $F'_1 = 9.60$ dB and for $F'''_1 = 8.82$ dB.

The FIGS. 10a to 10g show for a transmission system comprising a smearing filter and a desmearing filter with coefficients as shown in Table III the graphs which correspond to the graphs shown in FIGS. 9a to 9g for a transmission system comprising filters in accordance with Table I. A comparison of FIG. 10f with FIG. 9f shows a still flatter smeared noise pulse for filters realized in accordance with Table I and consequently a still better smearing efficiency.

It will be obvious that sequences of real numbers c(n) which are realized in a different manner or are known per se from mathematics, can also be used as long as for a given noise pulse pattern p(n) and a given value of the second merit factor $F_2$ the value of the first merit factor $F_1$ associated with p(n) has a substantially maximum value, as given by (30b).

TABLE I

A sequence of real coefficients c(n) for a filter with 64 coefficients which gives substantially the optimum value for $F'_1$ on the condition that $F_2 = 20$ dB is the following sequence:

$F'_1 = 3.244(10.22$ dB) $F_2 = 10.000(20.00$ dB) $F''_1 = 2.593$
$(8.28$ dB) $F''' = 2.860(9.13$ dB)

| | | | | | |
|---|---|---|---|---|---|
| −0.45 | −1.00 | −1.19 | −1.44 | −1.42 | 0.80 |
| 0.09 | 1.09 | 1.40 | 0.18 | 0.04 | −1.01 |
| −1.71 | −0.10 | 0.10 | 1.60 | 0.97 | 1.03 |
| −1.09 | 0.99 | −1.01 | 0.00 | 0.96 | 1.75 |
| 0.45 | −1.14 | −0.20 | −1.17 | 1.61 | 1.08 |
| −1.06 | −1.09 | −0.34 | 1.02 | 1.25 | 1.04 |
| −0.59 | −1.37 | 1.37 | 1.00 | −0.08 | −1.01 |
| −0.15 | 1.00 | 1.00 | −1.00 | −0.98 | 0.73 |

TABLE I-continued

A sequence of real coefficients c(n) for a filter with 64 coefficients which gives substantially the optimum value for F′₁ on the condition that F₂ = 20 dB is the following sequence:
F′₁ = 3.244(10.22 dB) F₂ = 10.000(20.00 dB) F″₁ = 2.593
(8.28 dB) F‴₁ = 2.860(9.13 dB)

| | | | | | |
|---|---|---|---|---|---|
| 1.01 | −1.16 | −1.03 | 0.20 | 1.08 | −0.67 |
| −1.05 | 1.33 | 1.00 | −1.31 | −1.00 | 1.54 |
| −1.00 | −1.00 | 0.00 | −0.49 | | |

TABLE II

A sequence with real values c(n) for a 64-coefficient filter which gives substantially the optimum value for F‴₁ on the condition that F₂ 10 (20 dB) is the following sequence
F′₁ = 3.011(= 9.57 dB) F₂ = 10.001(= 20.00 dB)
F″₁ = 2.949(= 9.39 dB)

| | | | | | |
|---|---|---|---|---|---|
| −0.33 | −0.88 | −1.33 | −1.50 | −1.46 | 0.93 |
| 0.11 | 1.18 | 1.44 | 0.25 | 0.01 | −1.02 |
| −1.76 | −0.44 | 0.23 | 1.80 | 1.14 | 1.15 |
| −1.18 | −1.05 | −1.05 | 0.07 | 0.98 | 1.77 |
| 0.59 | −1.18 | −0.32 | −1.29 | 1.73 | 1.20 |
| −1.18 | −1.21 | −0.53 | 1.15 | 1.41 | 1.18 |
| −0.75 | −1.49 | 1.38 | 1.04 | −0.18 | −1.04 |
| 0.05 | 1.03 | 1.05 | −0.84 | −0.89 | 0.67 |
| −1.06 | 1.45 | 1.01 | −1.28 | −1.11 | 1.82 |
| −0.80 | −1.22 | −0.13 | −0.27 | | |

TABLE III

A sequence of real coefficients c(n) for a 64-coefficients filter which gives very good results for F′₁ and F₂ is the following sequence:
F′₁ = 3.021(= 9.60 dB) F₂ = 21.598(= 26.70 dB)
F‴₁ = 2.726(8.82 dB)

| | | | | | |
|---|---|---|---|---|---|
| 0.36 | 0.00 | 1.03 | −0.89 | −0.17 | −1.06 |
| −1.00 | 0.00 | 1.00 | 1.04 | 1.07 | 1.28 |
| −1.10 | −1.00 | −1.00 | −1.24 | 1.00 | 1.00 |
| 1.21 | 1.16 | −1.00 | −1.00 | −0.06 | 0.02 |
| 1.00 | 1.17 | −1.06 | −1.07 | −0.93 | 1.00 |
| 1.00 | −1.04 | −1.00 | −1.00 | 1.00 | 1.00 |
| 1.00 | −1.00 | −1.00 | 0.00 | 1.00 | −1.08 |
| −1.11 | −0.04 | 1.00 | 1.31 | −1.10 | 0.90 |
| 1.14 | 1.19 | −1.03 | −1.07 | 1.00 | 0.02 |
| −1.00 | −1.01 | 1.00 | −0.02 | −1.00 | 0.00 |
| 1.01 | 0.00 | −1.00 | 0.93 | | |

What is claimed is:

1. A transmission system for transmitting data signals in a modulation band comprising:
   a transmitter comprising a modulator and transversal smearing filter;
   a receiver comprising a demodulator and desmearing filter;
   said transversal filters each comprising:
   a plurality of N−1 series connected delay elements, each element forming a tap with an adjacent element; and
   a signal processing arrangement connected to said taps as well as to first and second ends of said series of connected delay elements, said signal processing arrangement multiplying during each symbol interval of said data signals by a plurality of real coefficients, said desmearing filter for a selected upper limit of intersymbol interference resulting from said transversal filters having a set of coefficients Cd(n), n=0, . . . N−1 some but not all being chosen from the set {+1, 0, −1}, and chosen for a given transmission system gain to have a maximum value first merit factor F₁ defined by $$F_1 = \frac{\max_n |(\tilde{p} \ast g)(n)|}{\max_n |(\tilde{p} \ast \tilde{c}_d \ast g)(n)|} \quad n = 0, 1, \ldots N-1$$

wherein $\tilde{p}(n) = p(n)e^{-jn\theta_c}$, $\tilde{c}_d(n) = c(n)e^{-jn\theta_c}$, where $\theta_c$ is given modulation angular frequency, p(n) the sampling values of any given noise pulse introduced into the transmission path and g(n) the impulse response reconverted to zero frequency, of the receiver without a desmearing filter.

2. A transmission system as claimed in claim 1, characterized in that the intersymbol interference of the cascade arrangement of the smearing filter and the desmearing filter is inversely proportional to a second merit factor F₂ equal to $$F_2 = \frac{\max_n |h(n)|}{\left| \sum_n \mu(n) \right|^2}$$

wherein $\mu(n) = h'(n) - h(n)$, h(n) is the overall equivalent impulse response of the transmission system without the smearing filter and the desmearing filter and h′(n) the overall equivalent impulse response of the transmission system comprising the smearing filter and the desmearing filter, and that the optimization of the first merit factor F₁ is effected for a predetermined lower limit of this second merit factor F₂.

3. A transmission system as claimed in claim 1, wherein for the sequence of real coefficients $c_s(n)$, n=0, 1, . . . N−1 of the smearing filter having N−1 delay elements $c_s(n) = c_d(N_o - n)$ for any value of $N_o$ and for all values of n.

4. The transmission system as claimed in claim 1, wherein the sequence of real coefficients $c_d(n)$, n=0, 1, . . . N−1 of the desmearing filter having N−1 delay elements is chosen such that it comprises numbers of the set {+1, 0, −1} and for a given output power and for a given overall gain of the system provide a substantially maximum value of a first merit factor F₁ defined by $$F_1 = \frac{\max_n |(\tilde{p} \ast g)(n)|}{\max_n |(\tilde{p} \ast \tilde{c}_d \ast g)(n)|} \quad n = 0, 1, \ldots N-1$$

wherein $\tilde{p}(n) = p(n)e^{-jn\theta_c}$, $\tilde{c}_d(n) = c_d(n)e^{-jn\theta_c}$, where $\theta_c$ is a given modification angular frequency, p(n) the sampling values of any given noise pulse applied to the desmearing filter and g(n) the impulse response of the filter action, reconverted to zero frequency, of the receiver without desmearing filter, for a given intersymbol interference of the cascade arrangement of the desmearing filter and the smearing filter of the transmission system.

5. A smearing filter for use in a transmission system as claimed in claim 1, wherein for the sequence of real coefficients $c_s(n)$ n=0, 1, . . . N−1 of a filter having N−2 delay elements it holds that $c_s(n) = c_d(N_o - n)$ for any value of $N_o$ and for all values of n.

* * * * *

UNITED STATES PATENT AND TRADEMARK OFFICE
CERTIFICATE OF CORRECTION

PATENT NO. : 4,660,216
DATED : April 21, 1987
INVENTOR(S) : Theodoor A.C.M. Claasen et al Page 1 of 4

It is certified that error appears in the above-identified patent and that said Letters Patent is hereby corrected as shown below:

IN THE SPECIFICATION

Column 2, line 25    change "H" to --*-- (all occurrences)

, 7, line 50    change "H" to --*--.

10, line 20    change "H" to --*-- (all occurrences)

13, line 5    change "H" to --*-- (all occurrences)

IN THE CLAIMS

Column 18, line 3    change $$"F_1 = \frac{\max_n |(\tilde{p} H g)(n)|}{\max_n |(\tilde{p} H \tilde{c}_d H g)(n)|}"$$

to $$--F_1 \frac{\max_n |(\tilde{p} * g)(n)|}{\max_n |(\tilde{p} * \tilde{c}_d * g)(n)|} --$$

UNITED STATES PATENT AND TRADEMARK OFFICE
CERTIFICATE OF CORRECTION

PATENT NO. : 4,660,216
DATED : April 21, 1987
INVENTOR(S) : Theodoor A.C.M. Claasen et al It is certified that error appears in the above-identified patent and that said Letters Patent is hereby corrected as shown below:

IN THE CLAIMS

Claim 1, Column 18, line 9    change "$e^{-jn\theta}c$" to --$e^{-jn\theta}c$-- (both occurrences)

line 9    change "$c(n)$" to --$c_d(n)$-- line 10    insert --a-- after "is"

Claim 2, Column 18, line 15    delete "char-"

line 16    delete "acterized in that"

insert --wherein--

Claim 3, Column 18, line 37    insert --,-- after "elements"

Claim 4, Column 18, line 53    change "$c_d$" to --$\tilde{c}_d$-- (first occurrence)

UNITED STATES PATENT AND TRADEMARK OFFICE
CERTIFICATE OF CORRECTION

PATENT NO. : 4,660,216

DATED : April 21, 1987

INVENTOR(S) : Theodoor A.C.M. Claasen et al

It is certified that error appears in the above-identified patent and that said Letters Patent is hereby corrected as shown below:

IN THE CLAIMS

Claim 4, Column 18, line 50 change $$"F_1 = \frac{\max_n |(\tilde{p}\ g)(n)|}{\max_n |(\tilde{p}\ \tilde{c}_d\ g)(n)|} "\text{ to}$$

$$--F_1 = \frac{\max_n |(\tilde{p}*g)(n)|}{\max_n |(\tilde{p}*\tilde{c}_d*g)(n)|} --$$

line 53 change "$p(n) = p(n)e^{-jn\theta c}$" to $$--\tilde{p}(n) = p(n)e^{-jn\theta}c--;$$

UNITED STATES PATENT AND TRADEMARK OFFICE
CERTIFICATE OF CORRECTION

PATENT NO. : 4,660,216
DATED : April 21, 1987
INVENTOR(S) : Theodoor A.C.M. Claasen et al It is certified that error appears in the above-identified patent and that said Letters Patent is hereby corrected as shown below:

line 53    change "$c_d(n) = c_d(n)e^{-jn\theta c}$" to
--$\tilde{c}_d(n) = c_d(n)e^{jn\theta}c$--

Signed and Sealed this

Twenty-eighth Day of February, 1989

*Attest:*

DONALD J. QUIGG

*Attesting Officer*      *Commissioner of Patents and Trademarks*